United States Patent

Feild

[15] 3,693,850
[45] Sept. 26, 1972

[54] FIBRILLATION BY OPPOSED BEATER BARS

[72] Inventor: George B. Feild, Stone Harbor, N.J.

[73] Assignee: Hercules Incorporated, Wilmington, Del.

[22] Filed: Aug. 3, 1970

[21] Appl. No.: 60,444

[52] U.S. Cl. .................225/3, 225/93, 225/97
[51] Int. Cl. .................................B26f 3/02
[58] Field of Search........225/2, 3, 93, 97; 28/DIG. 1; 57/31; 264/DIG. 8, 154; 83/660, 2

[56] References Cited

UNITED STATES PATENTS 3,550,826   12/1970   Samela........................225/3
2,976,578   3/1961    Virgil.....................225/97 UX
3,494,522   2/1970    Kion et al..................225/97
3,565,308   2/1971    Slack.......................225/97

*Primary Examiner*—Frank T. Yost
*Attorney*—John W. Whitson

[57] ABSTRACT

A striated film is fibrillated by passing the film between a pair of opposing rotating beater bars. In this manner uniform tension is maintained across the film urging the film in engagement with serrated edges which may be on one or both of the beater bars. This system permits higher film linear speed than can be achieved in previous prior art beater bar systems.

9 Claims, 5 Drawing Figures

PATENTED SEP 26 1972

GEORGE B. FEILD
INVENTOR

BY Sheldon F. Raizes
ATTORNEY

PATENTED SEP 26 1972 3,693,850

GEORGE B. FEILD
*INVENTOR*

BY *Sheldon F. Raizes*
ATTORNEY

FIBRILLATION BY OPPOSED BEATER BARS

This invention is an improvement on the beater bar system disclosed in U.S. Pat. Nos. 3,494,522 and 3,496,752 which are owned by the assignee of this application.

An object of this invention is to provide a beater bar fibrillation system which assures uniform tension across the film to be fibrillated regardless of the width of the film.

Another object of the invention is to provide a beater bar fibrillation system which will allow higher linear film speeds than in previous beater bar systems.

Other objects of the invention will become apparent from the following description with reference to the drawing wherein.

Figure 1:
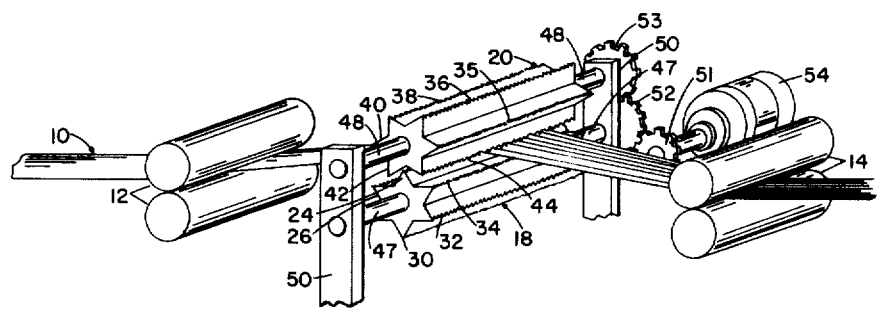
FIG. 1 is a schematic view of a film fibrillation system embodying the present invention.
Figure 2:
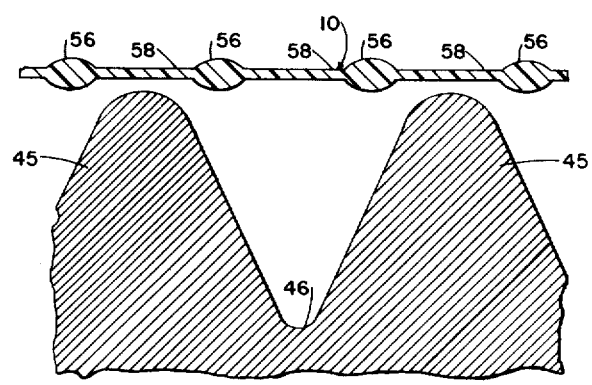
FIG. 2 is a partial view taken in section of a serrated edge and striated film.
Figure 3:
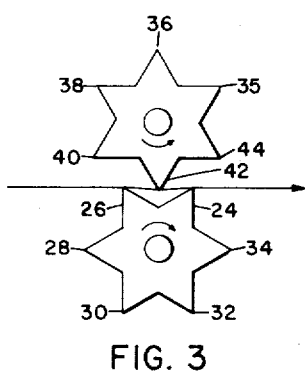
FIG. 3 is a partial end view of FIG. 1 illustrating the beater bars after they have been rotated 30° from the position of FIG. 1.

Referring to FIGS. 1–3, a system for fibrillating film is schematically illustrated. A striated ribbon 10, which has been uniaxially oriented in the lengthwise direction, is fed between a pair of feed rolls 12 and a pair of draw rolls 14. The space between the feed rolls 12 and draw rolls 14 defines a fibrillation zone and the rolls 12 and 14 are driven at relative speeds to maintain the section of ribbon 10 in the fibrillation zone under tension. The tensioned section of the film is engaged by a pair of opposed intermeshing beater bars 18, 20 each of which comprises six (6) serrated edges. The beater bar 18 comprises serrated edges 24, 26, 28, 30, 32 and 34 and the beater bar 20 comprises serrated edges 35, 36, 38, 40, 42 and 44. Each serrated edge comprises teeth 45 and valleys 46 separating the teeth an equal distance from each other and positioned on successive edges to form a fixed helix angle around the bar. The pitch or helix angle of the teeth on the beater bar 18 is in the same direction and at the same angle as the pitch of the teeth on the beater bar 20. The beater bars 18 and 20 are journaled for rotation about their axes by means of trunnions 47 and 48, respectively, extending from each end thereof, which extend into a pair of spaced supports 50 located at each end of the beater bars. Rotation of the beater bars 18 and 20 in opposite directions is imparted by any well known means as, for example, by an intermeshing gear train assembly 51, 52 and 53 driven by a motor 54. The beater bars are arranged so that their rotational axes are parallel to the pinch lines of the feed and draw rolls, and the edges of the beater bars engage the film on a line which is outside of a plane passing through the pinch lines creating additional tension on the film, whereby upon rotation of the beater bars tensioned engagement of the serrated edges with the film is assured and thus the film will be fibrillated.

The film 10 comprises a thin strip of thermoplastic material such as polypropylene, and, as illustrated in FIG. 2 is striated, or in other words, is provided with a series of substantially uniformly spaced parallel ribs or striations 56 running longitudinally thereof and interconnected by webs 58 of reduced thickness. The film 10 is uniaxially oriented in the direction parallel to the striations whereby the film is much stronger in a longitudinal direction than in a transverse direction of the film. In fact the transverse strength of each web is usually such that very little transverse force is required to tear or break the web 58 and separate the striations 56.

Each tooth 45 is rounded or blunt at the tip thereof and tapered outwardly towards the valley 46. Fibrillation occurs when the teeth 45 engage a web 58 and due to the tension on the film, the striations or ribs 56 are forced down against a respective tooth 45 creating a wedging action forcing the striations apart. As pointed out in U.S. Pats. Nos. 3,494,522 and 3,495,752, the type of pattern of fibrillation will depend upon the speed of rotation of the beater bar, the speed of the film, the angle of the helix path described by the teeth, the spacing of the teeth, the spacing of the striations and the strength of the webs.

In operation, the beater bars 18 and 20 are rotated in opposite directions as the film 10 is fed therebetween. As shown in FIG. 1, the serrated edge 24 on beater bar 18 and serrated edges 42 and 44 on beater bar 20 are in simultaneous engagement with the bottom and top surface of the film 10 and upon continued rotation of the beater bars, edge 44 disengages the film 10 while edges 42 and 24 remain in contact therewith and then edge 26 comes into contact with the film as shown in FIG. 3 which illustrates the beater bars after rotation of 30° from the position shown in FIG. 1. Obviously, the remaining edges of the beater bars will alternately come into contact with the top and bottom surfaces of the film in the same manner just described for edges 24, 26, 42 and 44.

Since at least one edge of teeth of each beater bar is always in engagement with the film, the film will be constantly driven in one lateral direction by the beater bar 18 and be constantly driven in the opposite lateral direction by the beater bar 20, counteracting the action of beater bar 18, due to the bars being rotated in opposite directions and the pitch of the teeth being in the same direction for each beater bar. Thus, the teeth on edge 24 will bias the film to the right as it comes into contact with the bottom surface of the film, the teeth on edge 42 will bias the film to the left as it comes into contact with the top surfaces of the film, the teeth on edge 26 will bias the film to the right as it comes into contact with the bottom surface of the film, etc. This shifting action, occurring alternately on the two bars, not only prevents lateral movement of the film in one direction but also increases the transverse forces on the film web 58 and the chance of teeth on succeeding edges for penetrating different web sections of the film.

Another advantage of this system is the higher linear rate at which film can be fibrillated. Compared with a single beater bar, which strikes the film with one edge at a time, the film is engaged simultaneously by three edges on the two opposing bars. At least three times the linear speed is possible for equivalent fibrillation at the same r.p.m. of the beater bar.

A further advantage of employing opposing beater bars is that wide films, especially films wider than 12 inches, can be fibrillated efficiently. Since one edge of one of the beater bars is always in engagement with an entire transverse portion of the film, the tension is evenly distributed across the film maintaining the film flat thereby preventing the same from transversely bowing or buckling and thus causing obvious problems.

Figure 4:
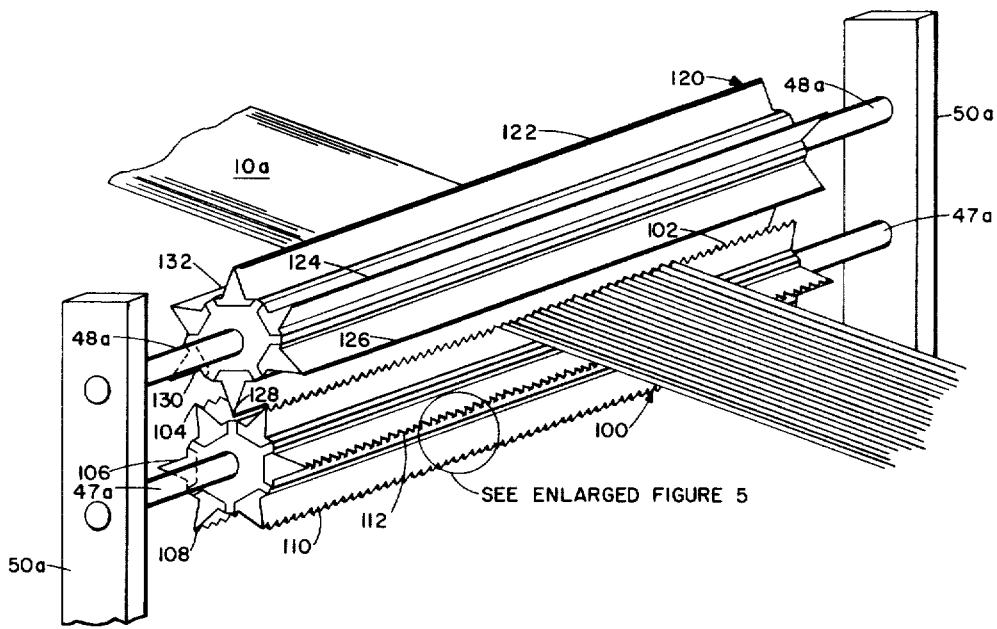
FIG. 4 illustrates a modification of the embodiment of FIG. 1.
Figure 5:
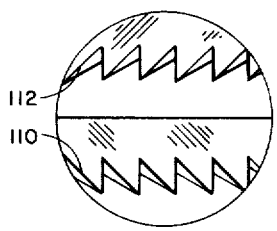
FIG. 5 is an enlarged view of the encircled portion of FIG. 4.

While the above described embodiment of FIGS. 1–3 is a preferred embodiment, a modified embodiment is shown in FIG. 4. Those elements which are the same as the embodiment of FIGS. 1–3 are designated with the same reference numerals only with an "a" affixed thereto. Beater bar 100 has serrated teeth on all of the edges 102, 104, 106, 108, 110 and 112 and the other beater bar 120 has smooth edges 122, 124, 126, 128, 130 and 132. In this case only beater bar 100 does the fibrillating and each edge of the beater bar 120 acts only to maintain uniform tension across the film assuring uniform engagement of the film with each entire serrated edge. At least two times the linear speed is possible for equivalent fibrillation at the same r.p.m. of the bar. Since two serrated edges of beater bar 100 are always in engagement with the film, it is necessary to have an even number of edges and reverse the pitch on alternate edges to prevent the film from riding laterally to one end of the beater bar 100. For instance, the teeth on edges 104, 108, and 112 may be pitched to the left and the teeth on edges 102, 106, and 110 may be pitched to the right. FIG. 5 shows edge 110 being pitched to the right and edge 122 being pitched to the left. In this manner the film is continuously shifted laterally back and forth preventing the film from riding laterally to one end of the beater bar 100 as well as imparting the shifting advantage as pointed out above. The alternating edge construction may be achieved by constructing a right hand screw and a left hand screw and cutting segments from each to provide serrated edges. These segments are then secured to a beater bar base member in any well known manner to provide a beater bar 100 with the alternating edges as shown in FIG. 4. The specific construction of beater bar 100 and the means for accomplishing the same is the subject matter of U.S. application Stanley D. Samluk Case No. 1 (common assignee) filed concurrently herewith and does not form a part of this invention.

A further modification is possible where in FIG. 4, both beater bars are the same as beater bar 100 with the serrations on alternating edges being pitched in opposite directions. The number of edges on each beater bar does not have to be even but the total number of edges having serrations pitched in one direction should equal the total number of edges having serrations pitched in the opposite direction in order to prevent the film from riding laterally to one end of the beater bar. This construction enables more radical transverse back and forth shifting of the film thereby producing greater transverse stresses on the webs 58 of the film for separating the striations 56.

While six edges on each beater bar and spirally aligned teeth have been illustrated, this is in no way limiting since this invention may be applied utilizing beater bars with any number of edges or with teeth which are pitched in parallel alignment circumferentially at right angles to the axis of the bar.

While the above systems are shown for fibrillating striated film, they may be utilized for fibrillating non-striated films. The only change would be that the serrated teeth would have sharp tips rather than rounded tips.

Thus it can be seen from the above description that applicant has produced an improved beater bar assembly capable of handling wide films and effecting higher linear film speeds and more efficient fibrillation than the beater bar assemblies disclosed in the prior art.

I claim:

1. A process of fibrillating a film: engaging one surface of the film with two longitudinally spaced serrated transverse edges while simultaneously engaging the other surface of the film with a transverse serrated edge located between said two serrated edges and then engaging said other surface with two longitudinally spaced serrated edges while simultaneously engaging said one surface of the film with a serrated transverse edge located between the latter said two edges thereby effecting tension across a transverse portion of the film urging the film against the entire serrated edges to fibrillate the film, the pitch of the serrations engaging said one surface being in the same direction and at the same angle as the pitch of the serrations engaging said other surface, and shifting the film transversely back and forth by engagement of the serrated edges therewith.

2. A process of fibrillating a film: engaging one surface of the film with two longitudinally spaced serrated transverse edges while simultaneously engaging the other surface of the film with a transverse edge located between said two serrated edges and then engaging said other surface with two longitudinally spaced edges while simultaneously engaging said one surface of the film with a serrated transverse edge located between the latter two edges thereby effecting tension across a transverse portion of the film urging the film against the entire serrated edges to fibrillate the film, all of the edges engaging said other surface of said film being smooth, the pitch direction of the serrations of one edge is in the opposite direction than the pitch of an adjacent serrated edge, and shifting the film transversely back and forth by engagement of the serrated edges therewith.

3. A process of fibrillating a film: engaging one surface of the film with two longitudinally spaced serrated transverse edges while simultaneously engaging the other surface of the film with a transverse edge located between said two serrated edges and then engaging said other surface with two longitudinally spaced edges while simultaneously engaging said one surface of the film with a serrated transverse edge located between the latter two edges thereby effecting tension across a transverse portion of the film urging the film against the entire serrated edges to fibrillate the film, the pitch direction of the serrations of one edge being in the opposite direction than the pitch of an adjacent serrated edge, and shifting the film transversely back and forth by engagement of the serrated edges therewith.

4. A process according to claim 3 wherein all of the edges engaging said other surface of said film are serrated, the pitch direction of the serrations of one edge is in the opposite direction than the pitch of an adjacent serrated edge striking the same surface of the film.

5. A process according to claim 3 wherein all of the edges engaging said other surface of said film are serrated.

6. In a film fibrillating assembly: first and second beater bars, each beater bar comprising the same number of projecting edges, means mounting said beater bars for rotation about parallel axes so that the projecting edges of the first beater bar will intermesh with the projecting edges of the second beater bar; all of the edges on said first beater bar being serrated, all of the edges on said second beater bar being serrated, the pitch of said serrations on one bar being in the same direction and at the same angle as the pitch of the serrations on the other bar, and means for rotating said beater bars in opposite directions.

7. In a film fibrillating assembly: first and second beater bars, each beater bar comprising the same number of projecting edges, means mounting said beater bars for rotation about parallel axes so that the projecting edges of the first beater bar will intermesh with the projecting edges of the second beater bar; all of the edges on said first beater bar being serrated, all of the edges of said second bar being serrated, the pitch of the serrations on adjacent edges of each beater bar being at the same angle but in opposite directions, and means for rotating said beater bars in opposite directions.

8. In a film fibrillating assembly: first and second beater bars, each beater bar comprising the same number of projecting edges, means mounting said beater bars for rotation about parallel axes so that the projecting edges of the first beater bar will intermesh with the projecting edges of the second beater bar; all of the edges on said first beater bar being serrated, the pitch of the serrations on adjacent edges of said first beater bar are at the same angle but in opposite directions, and means for rotating said beater bars in opposite directions.

9. The structure as recited in claim 8 wherein all of said edges on said second bar are smooth.

* * * * *